UNITED STATES PATENT OFFICE.

CHARLES TENNANT LEE, OF BOSTON, MASSACHUSETTS, ASSIGNOR OF ONE-HALF TO THE GOULD & WATSON COMPANY, OF SAME PLACE.

PROCESS OF ATTACHING COMPOSITION OF MATTER TO METAL.

SPECIFICATION forming part of Letters Patent No. 409,986, dated August 27, 1889.

Application filed June 14, 1889. Serial No. 314,291. (No specimens.)

*To all whom it may concern:*

Be it known that I, CHARLES TENNANT LEE, of Boston, county of Suffolk, State of Massachusetts, have invented a certain new and useful Improvement in the Process of Attaching Compositions of Matter to Metal, of which the following is a specification.

In the manufacture of many articles—such, for example, as handles for electrical switches, which it is desired shall be of considerable strength—a core or strengthening-piece of metal is used, which is enveloped wholly or partially in an insulating composition.

Mica compositions, consisting chiefly of mica or similar laminated material in a comminuted state bound together with a resinous gum—such, for example, as shellac—are largely used as insulators. They are good non-conductors, and may be molded when in a plastic condition to produce an object of any form desired. Many of the articles so made require to be strengthened, as, if made of the composition alone, they would be liable to break. To strengthen them, a metal core or strengthening-piece is inserted, as above stated, and the plastic mass molded around it into the shape desired.

Hitherto difficulty has been experienced in securely uniting the metal core to the composition, and so the composition was liable to come off the core or piece of metal with which it was in contact, and thus destroy the value of the article.

The object of my invention is a process by which articles molded from a composition of mica or similar material and a resinous gum can be secured firmly to a metal core or strengthening-piece; and it consists in the process hereinafter described, and which is set forth in the claim hereof.

One of the mica compositions which is employed, as above referred to, in making molded objects, consists of ground mica mixed and incorporated with shellac by the aid of heat. The mass, after being thoroughly mixed and while it is in a plastic condition, is placed in dies of the proper shape to mold it to the shape desired in the object which is to be produced, and the molding is accomplished by the compression of the plastic mass in the dies. These dies are warm. Before the plastic mass is placed in them the core or piece of metal which it is desired shall be attached to the molded object is heated until it is hot—that is, has reached a temperature of, say, 300° Fahrenheit, which is considerably higher than the temperature of the dies or the plastic mass. This core or piece of metal is then placed in proper position within the dies, together with the mass of plastic material, and the dies closed under pressure, compressing the mass and molding the article to shape around the metallic core. The object is allowed to remain in the dies to cool under pressure and is then ready for use or further manipulation. Such cooling under pressure prevents expansion of the molded object and enables the production of an article of exact size and shape with a close uniform surface, and the composition part of said article, even if fractured into many pieces, will still remain firmly secured to the metal.

I am aware that it is not new to produce objects made from plastic material inclosing metallic cores or strengthening-pieces; but, so far as I know, the cores or strengthening-pieces are not heated in the process of securing them in place, and if the composition be fractured it will easily detach from the metal, rendering the article worthless.

What I claim is—

The process of producing molded objects, consisting of mica or similar material incorporated with a resinous gum and having a core or strengthening-piece of metal secured therein, consisting in first warming the dies, which are to give the exterior shape to the article to be molded, then heating the core or strengthening-piece to a much higher degree of heat than the dies or the plastic mass, and placing said core and said plastic mass together within the dies, and then molding and compressing into shape and allowing the object thus formed to cool before removing the pressure, substantially as described.

CHARLES TENNANT LEE.

Witnesses:
 WM. A. MACLEOD,
 C. E. NOLTE.